C. L. NICKLE.
TONGS.
APPLICATION FILED NOV. 21, 1918.

1,330,648.

Patented Feb. 10, 1920.

Witnesses
J. H. Crawford

Inventor
C. L. Nickle,
By Victor J. Evans
Attorney

UNITED STATES PATENT OFFICE.

CLARENCE L. NICKLE, OF KNOXVILLE, TENNESSEE.

TONGS.

1,330,648. Specification of Letters Patent. Patented Feb. 10, 1920.

Application filed November 21, 1918. Serial No. 263,520.

*To all whom it may concern:*

Be it known that I, CLARENCE L. NICKLE, a citizen of the United States, residing at Knoxville, in the county of Knox and State of Tennessee, have invented new and useful Improvements in Tongs, of which the following is a specification.

My present invention pertains to implements for use in conjunction with wheel tires; and it consists in the peculiarly constructed tongs, hereinafter described and claimed, which, by virtue of their construction, are adapted to be used to advantage in facilitating the application and removal of the tire casings of automobile wheels.

In the accompanying drawing, hereby made a part hereof:

Similar numerals of reference designate the corresponding parts in both views of the drawing.

Figure 1:
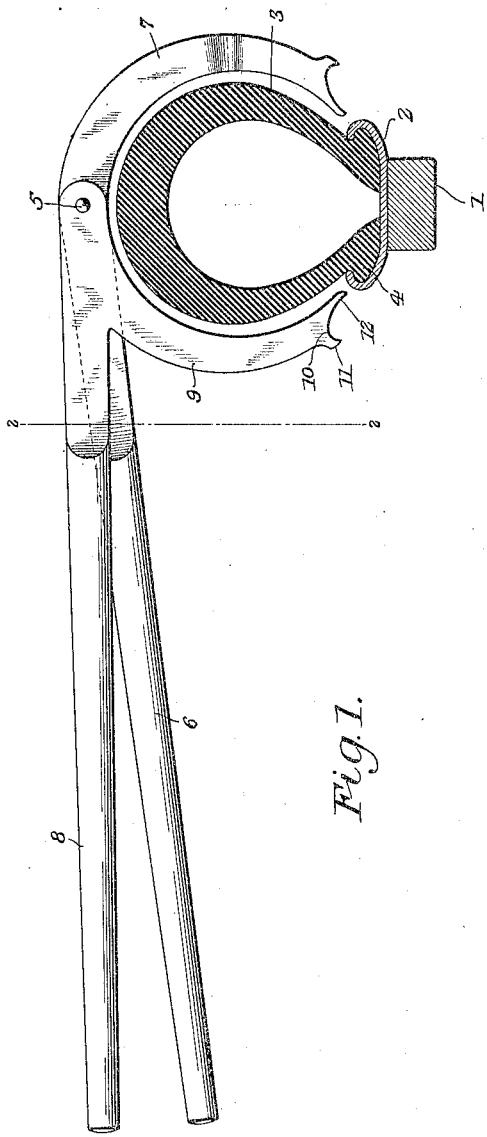
Figure 1 is a view, partly in elevation and partly in section, showing my novel tongs as properly arranged relative to the felly, clencher rim and tire casing of an automobile wheel.
Figure 2:
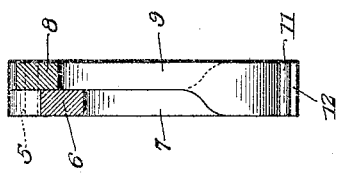
Fig. 2 is an edge elevation taken through the tongs *per se* in the plane indicated by the line 2—2 of Fig. 1, and showing the jaws of the tongs in edge elevation.

The felly 1, clencher rim 2 and tire casing 3 with flanges 4 are of the ordinary well known construction and are shown herein merely to impart a clear understanding of my invention.

My novel tongs comprise two members pivotally connected together through the medium of a transverse pintle 5. One of the said members is made up of a handle portion 6 and a jaw 7 which forms a continuation of said handle portion.

The other member includes a handle portion 8 and a jaw 9; the said jaw 9 being carried laterally from the handle portion 8 at a point in rear of the pivotal connection between the members. The jaws 7 and 9 are curved in general conformity to the perimeter of a tire casing, and each is provided at its extremity with a comparatively broad seat 10, concave in cross section, and is also provided with an outer projection 11 and an inner projection 12; the inner projection 12 being comparatively long in about the proportion illustrated.

In the practical use of my novel tongs for the removal of the casing 3, the tong jaws are positioned as shown in Fig. 1 relative to the rim 2 and the casing 3, and the handle portions are compressed together, whereupon the projections 12 of the jaws will force the flanges 4 of the casing 3 from under the rim flanges, and the concavities 10 of the jaws will assume positions on and bear upon the rim flanges, whereupon lifting of the handle portions of the tongs upwardly will be attended by the removal of the casing outwardly beyond and clear of the rim flanges. I would also have it understood that my novel tongs are capable of successful use in the application of the casing 3; the said casing 3 being applied by hand to as great an extent as possible after which the concavities 10 of the jaws 7 and 9 are arranged to bear upon the rim flanges, and the jaws are moved toward each other, and the handle portions 6 and 8 are moved upwardly. Manifestly, when this operation is carried out, the jaws 7 and 9 will serve to quickly crowd the flanges 4 of the casing 3 into proper engagement with the rim flanges.

Having described my invention, what I claim and desire to secure by Letters Patent, is:

A tire tool comprising a pair of handles arranged side by side in parallelism and pivotally connected together adjacent one end, curvilinear jaws forming an integral part of said ends of the handles, said jaws being oppositely curved, of equal length and projected from one and corresponding edges of the handle, said jaws having relatively broad extremities, the broad extremity of one jaw being offset whereby both of said extremities lie in the same plane, and each extremity being provided with a concaved seat and relatively long and short projections.

In testimony whereof I affix my signature.

CLARENCE L. NICKLE.